United States Patent [19]

Sireci

[11] Patent Number: 5,357,055
[45] Date of Patent: Oct. 18, 1994

[54] ELECTRIC ROUTING SYSTEM FOR MODULAR OFFICE PARTITIONING SYSTEMS

[76] Inventor: Donald J. Sireci, 9 Oxford Dr., Lincolnshire, Ill. 60069

[21] Appl. No.: 966,513

[22] Filed: Oct. 26, 1992

[51] Int. Cl.⁵ ............................................. H02G 3/28
[52] U.S. Cl. ...................................... 174/48; 52/220.7
[58] Field of Search .......................... 174/48; 52/220.7

[56] References Cited

U.S. PATENT DOCUMENTS

| | | | |
|---|---|---|---|
| 3,236,545 | 2/1966 | Parkes et al. | 174/48 X |
| 3,377,756 | 4/1968 | Polhamus | 174/48 X |
| 4,232,183 | 11/1980 | Person | 174/48 |
| 4,808,768 | 2/1989 | Sireci | 174/48 |
| 4,899,018 | 2/1990 | Sireci | 174/48 |

*Primary Examiner*—Leo P. Picard
*Assistant Examiner*—David A. Tone

[57] ABSTRACT

A low and high voltage electrical routing system for the power, telephone and data transmission requirements in modular office partitioning. These modular partition systems frequently have lower horizontal baseline frames for electrical receptacles and conductor routing, and a vertical frame for higher mounted(beltline) additional electrical receptacles, and connectors for telephone and data transmission systems. The present routing system includes a junction box in the baseline frame aligned with the vertical frame, a "vertical" box positionable at a standard height in the vertical frame having an enclosed receptacle portion along one side, and an enclosed rigid raceway connecting the junction box and the enclosed portion of the vertical box. The vertical box can be mounted on either side of the panel by rotating it 180 degrees about a horizontal axis so the enclosed portion remains aligned with the raceway.

9 Claims, 4 Drawing Sheets

ELECTRIC ROUTING SYSTEM FOR MODULAR OFFICE PARTITIONING SYSTEMS

RELATED PATENTS

This application is related to my U.S. Pat. No. 4,808,768 issued Feb. 28, 1989, and my U.S. Pat. No. 4,899,018 issued Feb. 6, 1990.

BACKGROUND OF THE INVENTION

Modular office systems have become increasingly popular over the last decade for customizing open office space into compartmental individualized semi-private office areas. These systems are particularly useful in modern unpartitioned office buildings where the construction of permanent office or privacy partitions would be quite expensive, particularly where the tenant does not have a sufficiently long term lease to justify the expenditure for the construction of permanent office subdivisions.

These modular office systems basically consist of a plurality of standard vertical panels that are easily connectable to one another in either a straight line, a simple 90 degree corner, a "T" configuration, or a four-way 90 degree crossing configuration. Present day office systems of this type include panels in a plurality of standard widths, for example, 24 inch width, 30 inch width, and 48 inch width. Each of these panels has a rectangular peripheral frame assembly over which decorative exterior cover panels are mounted. This frame is adapted to carry one or more electrical receptacles on the lower horizontal frame member, and these receptacles are referred to as baseline receptacles. In 48 inch panels there are frequently provided two of these receptacles or receptacle openings, and in the 24 inch and 30 inch panels, one receptacle adaptation is frequently provided. In addition to the baseline receptacle openings or adaptations, these modular panels are provided with an adaptation for a higher receptacle, commonly referred to as a beltline receptacle.

During the installation of these modular office systems, the installing contractor will subcontract to an electrical contractor the job of installing the beltline and baseline receptacles in the frames after the frames have been set up and prior to the addition of the covering panels to the frames. Presently, conventional receptacle boxes are mounted on the frame by the contractor and the boxes are interconnected by either BX cable or conduit. This requires the electrical contractor to measure the distance between receptacles and to cut the BX or conduit to the needed dimensions. This is a particular problem because as noted above the panels have a variety of standard widths. Another problem is that the standard receptacle boxes and conventional wiring techniques are not acceptable in these modular office systems in locales with very strict fire codes.

In my U.S. Pat. No. 4,899,018, I describe an electrical raceway or routing system for standardized modular office systems that includes strengthening ribs in bottom plates which are utilized to guide and lock the present baseline boxes to the panels.

In the type of modular panels that routing system is adapted, a lower clearance is provided in each panel to accommodate routing systems, and this area is bounded on the bottom by a base plate, its sides by removable covers, and its top by a top plate. The panel is supported on the base plate by a plurality of tubular guide posts. The bottom plate has a pair of spaced ribs in the form of inverted U-shaped projections that run linearly along the base plate solely for strength purposes.

These strengthening ribs in the base plate are utilized as tracks to guide and lock the baseline boxes in position. Toward this end, the baseline box is provided with a bottom slide that takes the form of a channel member fixed to the bottom of the box with the legs of the channel being spaced so they just fit between the base plate strengthening ribs. This facilitates installation of the box because the ribs permit the installer to slide the baseline box back and forth until it is in alignment with the opening in the removable cover. It also transversely locates the box in the routing area and assures axial alignment of the box with respect to the panel itself.

In my U.S. Pat. No. 4,808,768, I describe an electric raceway or routing system for standardized modular office systems that can be installed without the use of any special tools, without cutting any cable or conduit, using only a simple screwdriver.

This electric routing system included a plurality of standard baseline boxes, one for each width panel. The baseline box for the 48 inch panel is 32 inches, and has two receptacle mounting locations, the baseline box for the 30 inch panel is 14 inches and has one central receptacle adapter, and the baseline box for the 24 inch panel is 8 inches in length and also has a central receptacle adapter. These baseline boxes are interconnected by standard length tubular connectors regardless of whether the box is a 32 inch box, a 14 inch box or an 8 inch box. There are two standard connectors each approximately 17¼ inches in length, one straight and one a 90 degree corner connector. These connectors enclose the electrical conductors between the baseline box mounted receptacles. The connectors, which are rectangular tubular sections, are all the same length even when connecting a 24 inch panel to a 48 inch panel because the baseline boxes all have a length with a fixed ratio to the width of its associated panel.

After the modular frames are erected, the electrical subcontractor interconnects the boxes with the standard tubular connectors, wires the receptacles together, screws the appropriate sized baseline box to each of the lower frame members with screws that go through the bottom of the boxes into the frame, fastens the receptacles to the boxes, and replaces the covers on the boxes and the installation is complete without the need for any BX or conduit cutting or receptacle box modification.

SUMMARY OF THE PRESENT INVENTION

In accordance with the present invention, an improved low and high voltage electrical routing system is provided for the power, telephone and data transmission requirements of modular office partitions. The entire routing system is standardized to accommodate baseline electrical receptacles and desktop level electrical receptacles and connectors for telephone and data transmission referred to as "beltline" components. Present day electrical routing systems are not standardized and thus difficult to install and their exposed wiring does not satisfy the more restrictive electrical codes of many of our present day cities.

These modular partitioning systems frequently have lower horizontal baseline frames for electrical receptacles and conductor routing, and a vertical frame for the higher mounted additional electrical receptacles and connectors for telephone and data transmission components.

Toward these ends, the present routing system includes a junction box in the baseline frame aligned with the vertical frame, a "vertical" or beltline box positionable at a standard height in the vertical frame having an enclosed receptacle portion along one side, and an enclosed rigid raceway connecting the junction box and the enclosed portion of the vertical box. The vertical box can be mounted on either side of the panel by rotating it 180 degrees about a horizontal axis so the enclosed portion remains aligned with the raceway.

The enclosed raceway can be utilized to enclose both low and high voltage wiring, but only the electrical receptacle portion of the "vertical" box is enclosed because complete enclosure is unnecessary for the low voltage telephone and data transmission components. Thus, with respect to the low voltage components, the raceway provides a convenient and organized method of directing these conductors to the vertical box.

The electrical receptacle portion of the vertical box is on one side of the box so that the box must be rotated 180 degrees when the box is switched from one side of the panel to the other. To accommodate these two orientations, both the upper and lower parts of the enclosed portion of the vertical box has openings designed to snugly receive the upper end of the raceway. A removable cover is attached to the upper one of the openings which of course is the unused one since the raceway always enters the vertical box from its lower end.

Other objects and advantages of the present invention will be more clearly apparent from the following detailed description.

DETAILED DESCRIPTION OF THE PREFERRED EMBODIMENT

Figure 1:
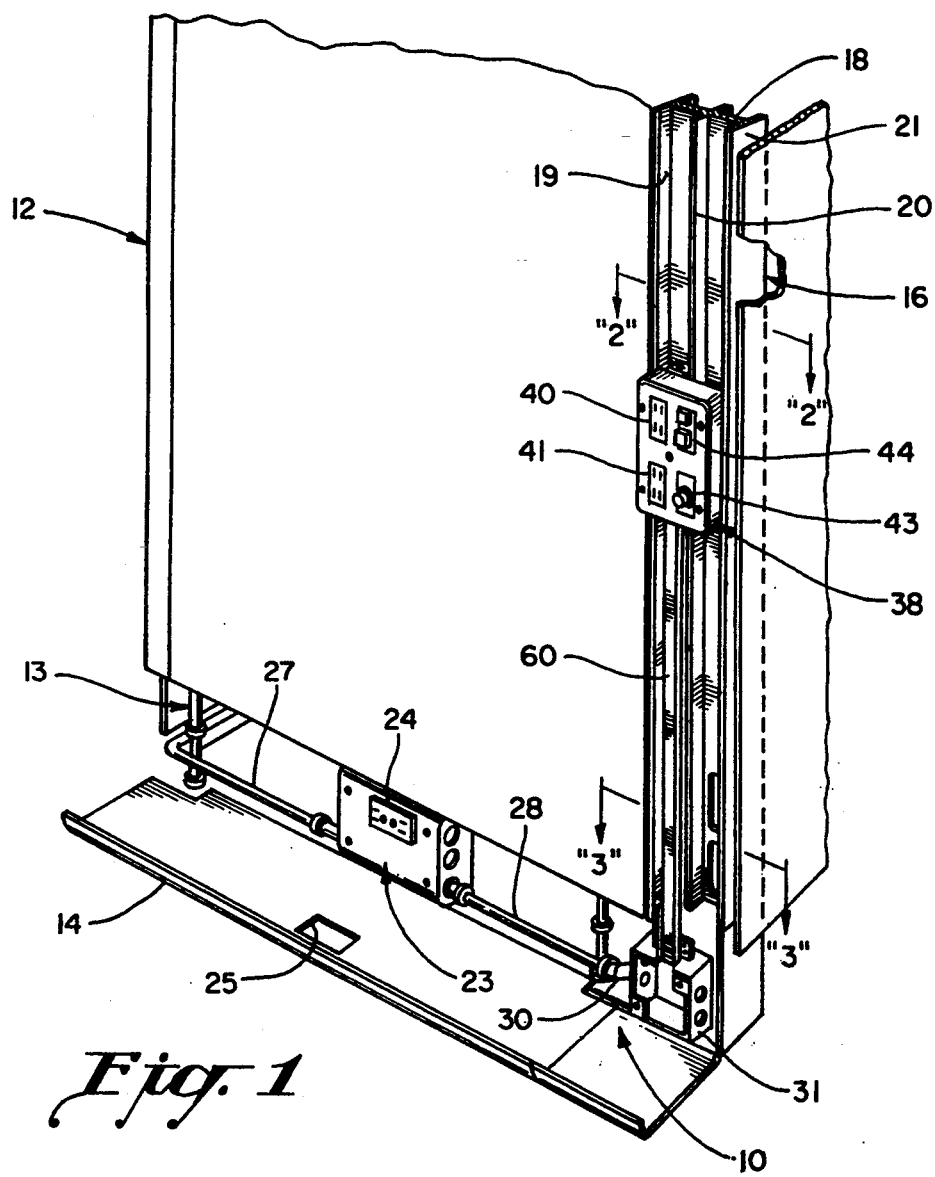
FIG. 1 is a perspective view of a fragment of a single modular panel with its baseline cover opened and its vertical frame broken away with the present routing system installed according to the present invention.

Referring to the drawings and particularly FIGS. 1 to 4, a portion 10 of an electrical routing system according to the present invention is shown in connection with one modular panel 12 of many associated with a modular office partitioning system. The panel 12 is by itself conventional and forms no part of the present invention.

The lower portion of the panel 12 has an open frame assembly 13 that is enclosed by a hinged base door 14 shown in its opened position in FIG. 1.

Panel 12 also includes a channel-shaped vertical frame 16 that includes a central web 18 and three ribs 19, 20 and 21 that extend on both sides of the central web 18.

The routing system 10 generally includes a plurality of galvanized sheet metal baseline boxes 23 that receive one or more electrical outlet receptacles 24 which when door 14 is closed, project through openings such as indicated at 25 in FIG. 1.

The baseline boxes 23 are connected together by rigid conduits such as indicated at 27 and 28. Conduit 28 is connected with an offset adapter 30 to an enclosed junction box 31 that is illustrated open in FIGS. 1 and 4 but after the installation is completed, a cover plate (not shown) is fastened by suitable fasteners through threaded flanges 35 and 36 shown in the exploded perspective of FIG. 4 so that box 31, as with baseline box 23, is completely enclosed by metal. Junction box 31 is fastened to the frame assembly 13 as is the baseline box 23.

The baseline boxes 23 carry electrical receptacles 24 but the conduits 27 and 28 extending around all the baseline frames 13 carry conductors for the vertical boxes such as box 38, which in addition to electrical receptacles 40 and 41, contain low voltage connectors such as telephone jack assembly 43 and computer terminal connector 44. The vertical box 38 is also sometimes referred to as a beltline box because of its elevated position and is approximately 31 inches above the junction box 31 so that it is in a position somewhat above the standard desktop height.

Vertical box 38 is seen to include a main rectangular body 45 having a rectangular opening 46 in its forward wall and an apertured plate 47 that is fixed within body 45 defining two rectangular vertically spaced openings therewith 49 and 50.

One vertical half of the body 45 is enclosed by a channel-shaped member 52 fixed to the body 45 that has opening 54 at one end and identical opening 55 at the other end that are selectively closed by L-shaped cover plate 56 and fasteners 57.

The channel-shaped member 52, along with one cover plate 56 over the open end of member 52 and the lower raceway 60, provide the required complete enclosure for the high voltage electrical receptacles 40 and 41.

Note that when mounted in the position illustrated in FIG. 1, the opening 54 is enclosed by one cover plate 56.

Figure 2:
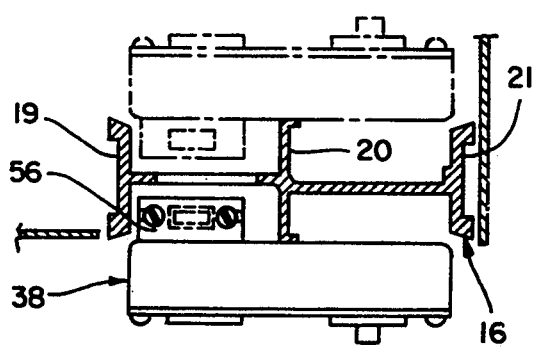
FIG. 2 is a fragmentary section taken generally along line 2—2 of FIG. 1.
Figure 3:
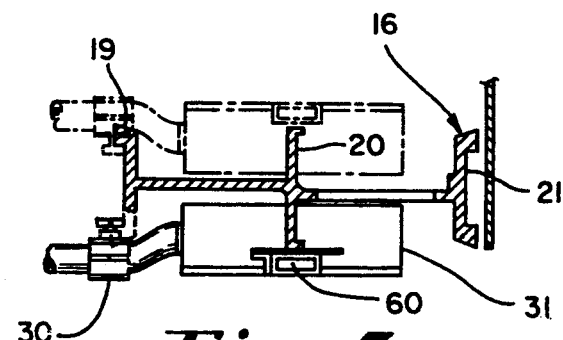
FIG. 3 is a fragmentary perspective taken generally along line 3—3 of FIG. 1.

The vertical box 38 is connected to the junction box 31 by enclosed raceway 60 that has a generally rectangular cross section as seen in FIGS. 2 and 3.

FIG. 2 shows the optional mounting of box 38 on either side of the vertical frame 16. Similarly, FIG. 3 shows the optional mounting of the junction box 31 on either side of the frame 16 corresponding to the same sides of the boxes shown in FIG. 2.

The openings 54 and 55 are sized to the exterior cross-sectional dimensions of the raceway 60 so that they slidably receive the raceway covering the U-shaped recesses 62 adjacent openings 54 and 55.

Note also that the cover plate 56 has a flange 64 that covers the U-shaped openings 62 such as at 62a in FIGS. 2, 4, 10 and 11.

Figure 4:
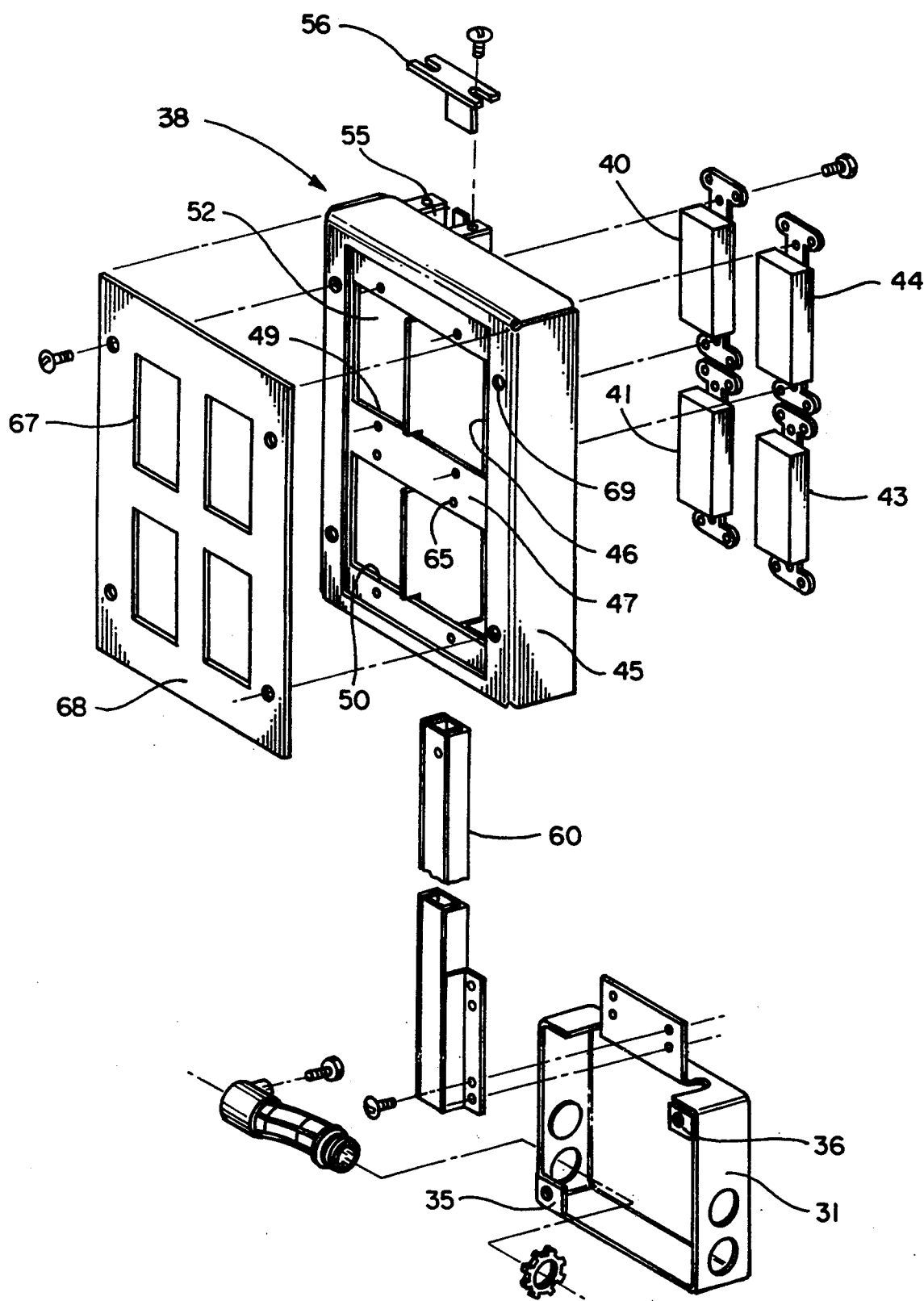
FIG. 4 is an exploded perspective view of the present vertical box, raceway and junction box according to the present invention.

The receptacles and connectors 40, 41, 44 and 43 are fastened to threaded apertures in plate 47 such as indicated at 65 in FIG. 4, and when assembled project somewhat through rectangular openings 67 in a cover plate 68 that is fastened to apertures 69 in the face of body 45.

An important aspect of the present invention is the capability of the box 38 to be mounted on either side of the vertical frame 16 so that it can face either direction. Toward that end, the box 38 can either be mounted in the orientation illustrated in FIG. 1 or it may be rotated 180 degrees about a horizontal axis to the position illustrated in FIG. 5. This is necessary so that the enclosing channel 52 is always over the position of the raceway 60 which is fixed with respect to frame 16. Thus, in the orientation illustrated in FIG. 4, the opening 55 is covered by cover plate 56, and the opening 54 receives raceway 60.

Figure 5:
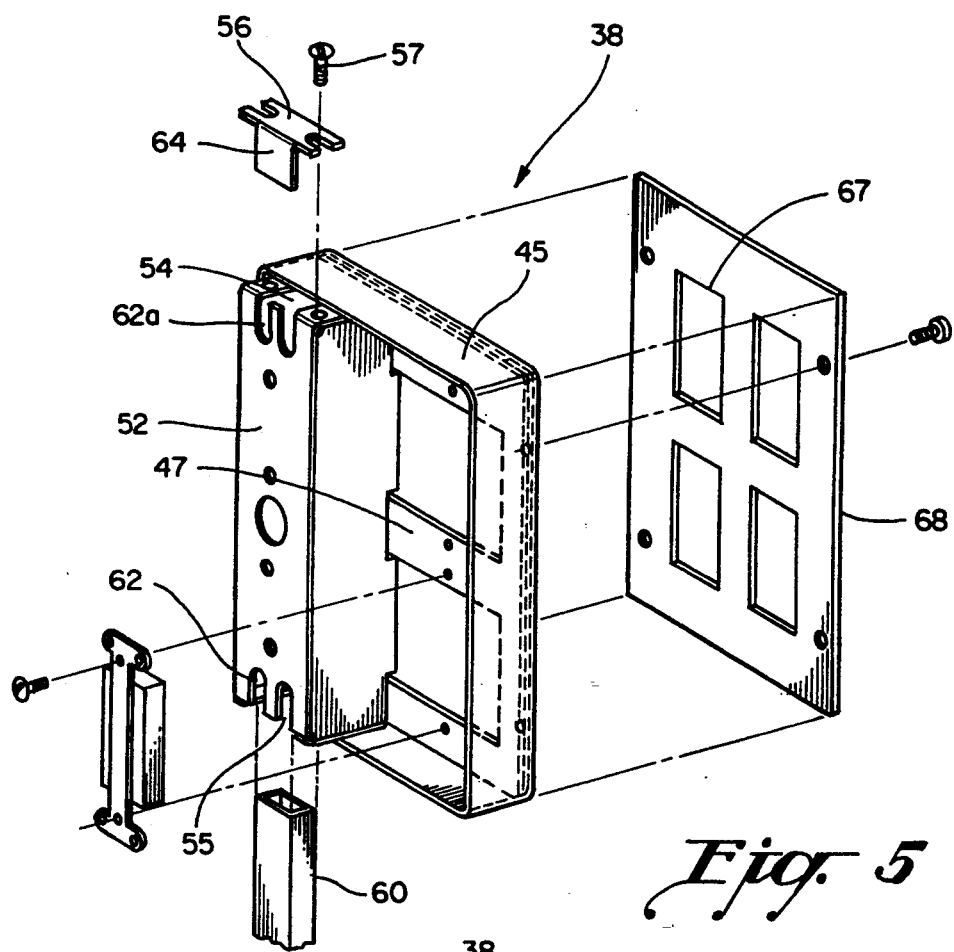
FIG. 5 is an exploded rear perspective view of the vertical box and fragmented raceway.
Figure 6:
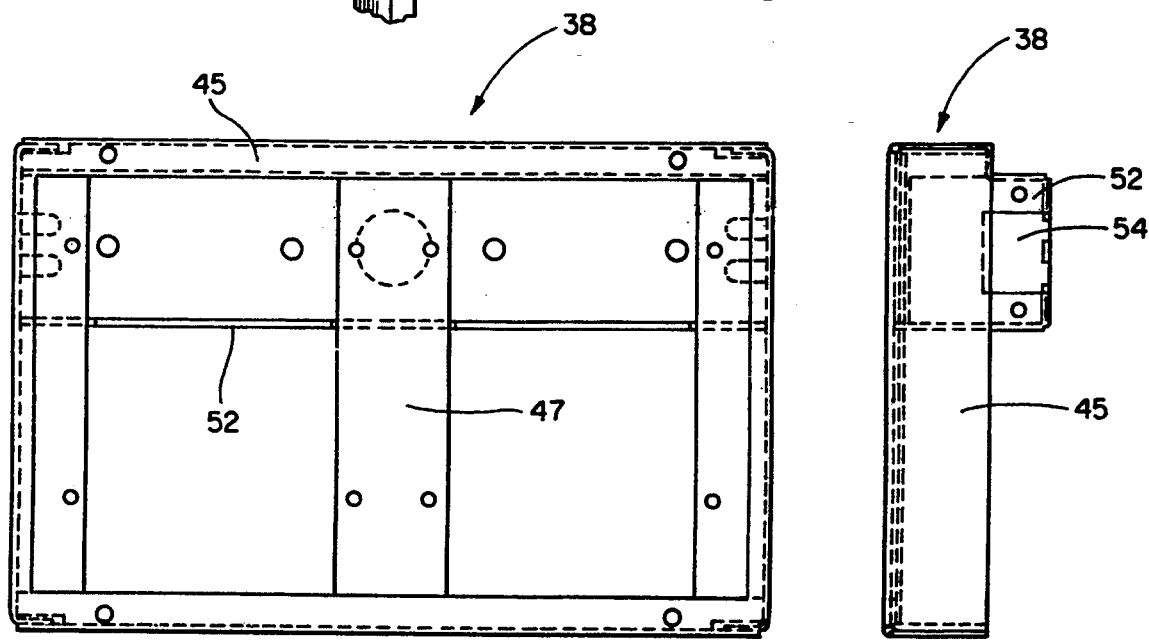
FIG. 6 is a front view of the vertical box rotated 90 degrees from one of its normal positions.
Figure 7:
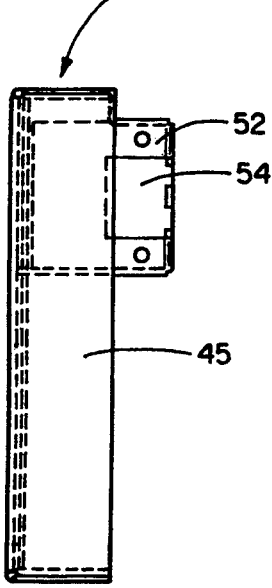
FIG. 7 is a right side view of the vertical box in the orientation of FIG. 6.
Figure 8:
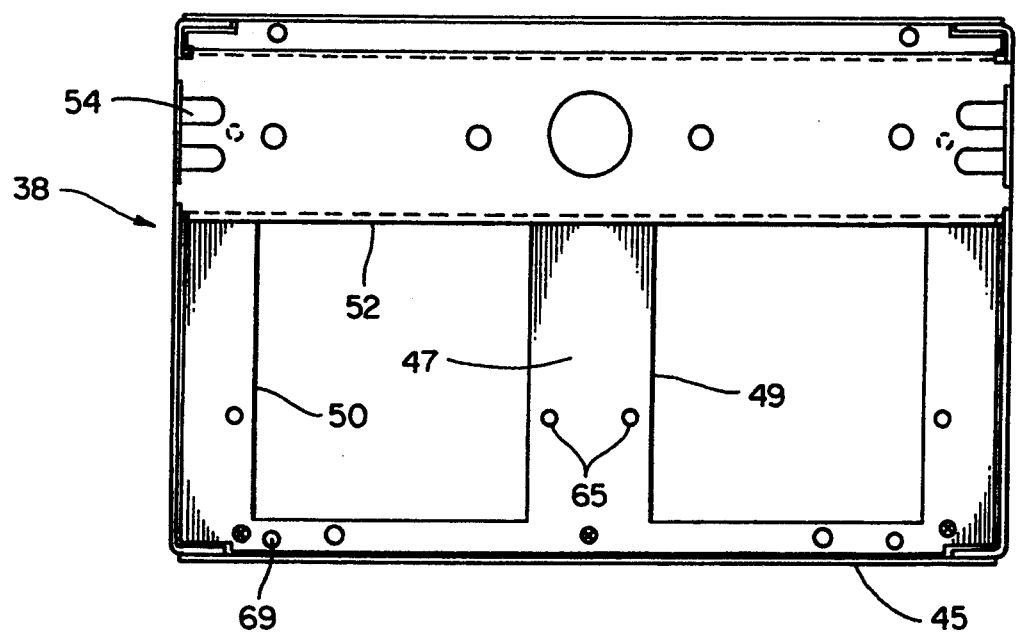
FIG. 8 is a rear view of the vertical box in the same orientation as FIG. 6.
Figure 9:
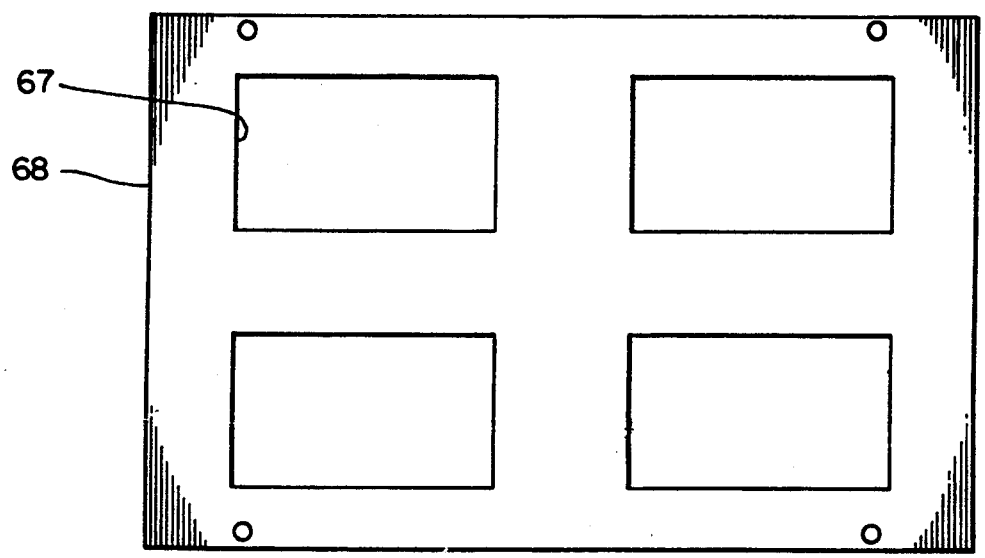
FIG. 9 is a plan view of the face plate or bezel shown at the right at FIG. 3 rotated 90 degrees from its normal position.
Figure 10:
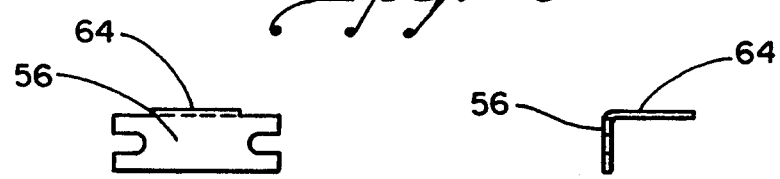
FIG. 10 is a front view of one of the cover sub-assemblies.
Figure 11:
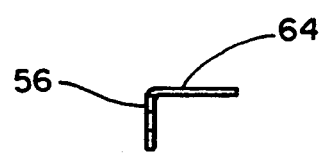
FIG. 11 is a right side view of the cover assembly illustrated in FIG. 10.

In the rotated position illustrated in FIG. 5, the vertical box 38 is in its position on the opposite side of the panel 12 illustrated in FIG. 1, and in that position the opening 55 receives raceway 60 and the opening 54 is enclosed by cover plate 56.

With this design of the vertical box 38, the same box can be utilized for either side mounting on panel 12 without any additional cost of parts or assembly.

I claim:

1. An electric routing system for modular office partitioning systems having modular panels with a baseline frame and a fairly narrow vertical frame along one side of the panel, comprising: a baseline box adapted to be mounted in the baseline frame, an electric receptacle mounted in the baseline box, a junction box adapted to be mounted in the lower end of the panel vertical frame, horizontal routing conduit connecting the baseline box and the junction box, conductors connecting the receptacle in the baseline box to the junction box through the routing conduit, a vertical box adapted to be mounted above the junction box in the vertical frame having an enclosed receptacle portion, an enclosed rigid raceway connecting the junction box and the vertical box receptacle portion, and a receptacle in the receptacle portion of the vertical box adapted to receive electrical conductors from the junction box.

2. An electric routing system for modular office partitioning systems having modular panels with a baseline frame and a fairly narrow vertical frame along one side of the panel, comprising: a baseline box adapted to be mounted in the baseline frame, an electric receptacle mounted in the baseline box, a junction box adapted to be mounted in the lower end of the panel vertical frame, horizontal routing conduit connecting the baseline box and the junction box, conductors connecting the receptacle in the baseline box to the junction box through the routing conduit, a vertical box adapted to be mounted above the junction box in the vertical frame having an enclosed receptacle portion and an adjacent horizontally spaced unenclosed receptacle portion, an electrical outlet receptacle in the enclosed receptacle portion and a low voltage connector in the unenclosed receptacle portion, and an enclosed raceway connecting the junction box to the enclosed receptacle portion of the vertical box for housing conductors between the junction box and the electrical outlet receptacle.

3. An electric routing system for modular office partitioning systems having modular panels with a baseline frame and a fairly narrow vertical frame along one side of the panel, comprising: a baseline box adapted to be mounted in the baseline frame, an electric receptacle mounted in the baseline box, a junction box adapted to be mounted in the lower end of the panel vertical frame, horizontal routing conduit connecting the baseline box and the junction box, conductors connecting the receptacle in the baseline box to the junction box through the routing conduit, a vertical box adapted to be mounted above the junction box in the vertical frame having an enclosed receptacle portion, said enclosed receptacle portion being positioned on one vertical side of the vertical box so the vertical box can be positioned on either side of the vertical frame by rotating the box 180 degrees about a horizontal axis, and a raceway positioned in the vertical frame in the same location for either side mounting of the vertical box, connecting the junction box to the enclosed receptacle portion of the vertical box.

4. An electric routing system for modular office partitioning systems as defined in claim 3, wherein said enclosed receptacle portion of the vertical box has an upper opening and a bottom opening each adapted to receive the raceway depending upon which side of the panel the vertical box is mounted on, and a removable cover for the unused one of the upper and lower openings.

5. An electric routing system for modular office partitioning systems as defined in claim 3, wherein the raceway is a rigid tube.

6. An electric routing system for modular office partitioning systems as defined in claim 3, including an adjacent horizontally spaced unenclosed receptacle portion, an electrical outlet receptacle in the enclosed receptacle portion and a low voltage connector in the unenclosed receptacle portion, said raceway connecting the junction box to the enclosed receptacle portion of the vertical box being constructed to house the conductors between the junction box and the electrical outlet receptacle and the low voltage connector.

7. An electric routing system for modular office partitioning systems as defined in claim 3, wherein said enclosed receptacle portion of the vertical box has an upper opening and a bottom opening each adapted to receive the raceway depending upon which side of the panel the vertical box is mounted on, and a removable cover for the unused one of the upper and lower openings, said raceway being a rigid tube.

8. An electric routing system for modular office partitioning systems as defined in claim 3, wherein said enclosed receptacle portion of the vertical box has an upper opening and a bottom opening each adapted to receive the raceway depending upon which side of the panel the vertical box is mounted on, a removable cover for the unused one of the upper and lower openings and an adjacent horizontally spaced unenclosed receptacle portion, an electrical outlet receptacle in the enclosed receptacle portion and a low voltage connector in the unenclosed receptacle portion, said raceway connecting the junction box to the enclosed receptacle portion of the vertical box being constructed to house conductors between the junction box and the electrical outlet receptacle and the low voltage connector.

9. An electric routing system for modular office partitioning systems as defined in claim 3, wherein said enclosed receptacle portion of the vertical box has an upper opening and a bottom opening each adapted to receive the raceway depending upon which side of the panel the vertical box is mounted on, a removable cover for the unused one of the upper and lower openings, said raceway being a rigid tube, said vertical box including an adjacent horizontally spaced unenclosed receptacle portion, an electrical outlet receptacle in the enclosed receptacle portion and a low voltage connector in the unenclosed receptacle portion, said raceway connecting the junction box to the enclosed receptacle portion of the vertical box being rigid and housing conductors between the junction box and the electrical outlet receptacle and the low voltage connector.

* * * * *